United States Patent [19]
Warmerdam et al.

[11] Patent Number: 6,089,742
[45] Date of Patent: *Jul. 18, 2000

[54] METHOD AND APPARATUS FOR CONTROLLING ROBOTS AND THE LIKE USING A BUBBLE DATA HIERARCHY PLACED ALONG A MEDIAL AXIS

[76] Inventors: Thomas P. H. Warmerdam, 19 Fuller Rd., Ossining, N.Y. 10562; Bernard J. H. Verwer, Bikolaan 23, 2622 EH Delft, Netherlands

[*] Notice: This patent is subject to a terminal disclaimer.

[21] Appl. No.: 07/430,749

[22] Filed: Nov. 1, 1989

[51] Int. Cl.$^7$ .................................................. G06F 19/00
[52] U.S. Cl. ..................................... 364/167.01; 395/90
[58] Field of Search .................................. 364/513, 461, 364/424.2, 474.02, 559, 167.01; 901/50, 49; 701/301, 210, 23–28; 395/85, 88, 90

[56] References Cited

U.S. PATENT DOCUMENTS

| | | | |
|---|---|---|---|
| 4,063,073 | 12/1977 | Strayer ..................................... | 364/439 |
| 4,578,757 | 3/1986 | Stark ....................................... | 364/461 |
| 4,862,373 | 8/1989 | Meng ....................................... | 364/461 |
| 4,888,707 | 12/1989 | Shimada .......................... | 364/474.2 X |
| 4,941,103 | 7/1990 | Kato .................................... | 364/461 X |

FOREIGN PATENT DOCUMENTS 2196763   5/1988   United Kingdom .

OTHER PUBLICATIONS

O'Rourke et al—"Decomposition of Three–Dimensional Objects into Spheres"—IEEE Trans. on Pattern Analysis and Machine Intelligence, vol. PAM–1, No. 3, Jul. 1979 pp. 295–305.

Cameron—"A Study of the Clash Detection Problem in Robotics" IEEE Intl Conf. on Robotics and Automation—1985—pp. 488–493.

Verwer—"Improved Metrics in Image Processing Applied to the Hildetch Skeleton"—IEEE Catalog, No. CH2614—6/88/0000/0137—1988—pp. 137–142.

Ruff et al.—Path Planning in a Three Dimensional Environment—IEEE Catalog No. 84CH2046–1, 1984, p. 188–191.

Badler et al—"A Spherical Representation of a Human Body for Visualizing Movement"—Proc. of IEEE, vol. 67, No. 10, Oct. 1979.

Sawatsky—"Using an Efficient Collision Detector in the Solution of the Find–Path Problem of Industrial Robots"—SPIE vol. 579, Intelligent Robots and Computer Vision (1985) pp. 131–141.

*Primary Examiner*—Joseph Ruggiero

[57] ABSTRACT

A robotic controller or similar machine represents the shape of an object as a hierarchy of bubbles. The position and radius of each of the bubbles is determined by first calculating the coordinates of the medial axis of the object and then creating a hierarchy of bubbles all of which are disposed on the medial axis. The bubbles may be generated using a top-down algorithm which sequentially places bubbles around portions of the object represented by subdivisions of branches of the medial axis. Alternatively the bubbles may be placed by using a bottom-up algorithm which combines the smallest of a large number of bubbles centered on the medial axis with its smallest neighbor to generate successively higher level bubbles in the hierarchy.

5 Claims, 4 Drawing Sheets

METHOD AND APPARATUS FOR
CONTROLLING ROBOTS AND THE LIKE
USING A BUBBLE DATA HIERARCHY
PLACED ALONG A MEDIAL AXIS

The invention relates to method and apparatus for calculating and controlling the motion of objects and machines. More particularly, the invention relates to the generation of data sets which represent the space occupied by objects.

BACKGROUND OF THE INVENTION

In the field of robotics and automation there has recently been much interest in the problem of choosing paths for a set of objects so they do not collide. These methods are described, for example, in U.S. Pat. No. 4,949,277, in U.S. patent application Ser. No. 617,303 filed Nov. 16, 1990, U.S. patent application Ser. No. 646,516, filed Jan. 25, 1991 abandoned and U.S. patent application Ser. No. 392,636, filed Aug. 11, 1989 abandoned.

A simpler problem is collision detection, that is: the determination of whether or not a collision will occur when the paths and positions of objects are determined. Prior art collision detection algorithms are described in "A Study of The Clash Detection Problem in Robotics", S. Cameron, 1985, *IEEE International Conference on Robotics and Automation*, P. 488 et seq. which is incorporated herein as background material.

The prior art teaches that the size and shape of objects may be modeled as a series of overlapping circles (in two dimensions) or spheres (in three dimensions). These principles are described, for example, in "A Spherical Representation of The Human Body for Visualizing Movement", S. Badler et al, *Proceedings of The IEEE*, Vol. 67, No. 10, October 1979 and in published U.K. Patent Application 2,196,763A (May 5, 1988). The prior art also teaches that a hierarchy of such circles or spheres may be effectively used to represent the shape of an object in a data structure at varying levels of detail. See for example "Using an Efficient Collision Detector in The Solution of The Find Path Problem of Industrial Robots", Sawatzky, El-Zorkany, *SPIE In Soc. Opt. Eng.,* Vol. 579, PP. 131–141 (1985).

The prior art also recognizes that, in some cases, the centers of spheres which were used to represent an object may be used to find the medial axis or skeleton of an object. See, for example, "Decomposition of Three-Dimensional Objects Into Spheres", O'Rourke and Badler, *IEEE Transactions On Pattern Analysis and Machine Intelligence,* Vol. PAMI-1, No. 3, July 1979.

In the description and claims which follow, spheres and circles of the above-mentioned data structure is referred to as a bubble hierarchy.

In a typical bubble hierarchy, the top or root of the hierarchy is a single spherical bubble, the enclosing bubble which encloses an entire object. This is the most coarse level of detail in the data structure. Within the top bubble, there are a small plurality of bubbles, each of which encloses a portion of the object and combined enclose the entire object. Within each of the bubbles at this second, successor level, there may be another plurality of bubbles, each of which encloses a smaller portion of the object. The expansion of bubbles to enclose finer level of detail continues until the bottom of the bubble hierarchy is reached. The bubbles at the bottom of the hierarchy each describe a small fragment of the object. In the simplest case, these bubbles are assumed to be solid; i.e. every point in the interior of such a bubble is assumed to be in the interior of the object.

A bubble hierarchy is useful for determining whether a point is inside or outside of an object and whether two objects (each represented by separate bubble hierarchies) intersect. The general technique for answering these questions is called bubble bursting. In a typical us of bubble bursting for determining whether a point is inside an object, a point-in-bubble test is first applied to the enclosing bubble. If this succeeds, (i.e., the point is found to be inside the enclosing bubble) then the bubble is burst, revealing the group of successor bubbles immediately below it in the hierarchy. The test is repeated with each of these bubbles. Wherever the test succeeds, the tested bubble is burst revealing the bubbles at the level immediately below it and those bubbles are tested. The procedure terminates if the point is found to be inside a bubble at the bottom of the hierarchy (in which case the point is inside the object) or if the point is found to be outside all the remaining bubbles after a certain number have been burst.

While techniques for using bubbles to plan and control the motion of machines and robots are well-known in the art, the problem of finding an optimum placement of bubbles to represent a given object remains. Computational time can be decreased and machine speed increased if an optimal bubble placement is determined, yet many bubble placement methods which have been suggested in the prior art operate efficiently in two dimensional systems but which become complex and time consuming when expanded to the representation of three dimensional objects and systems.

SUMMARY OF THE INVENTION

In accordance with the invention, the coordinates of the medial axis of an object are first determined. A data structure which represents the object as a hierarchy of bubbles is then generated by placing the centers of bubbles along the medial axis.

Bubbles may be placed along the medial axis using a top-down method which successively divides branches of the medial axis to generate increasingly lower levels in a tree structure. Alternatively, bubbles may be placed using a bottom-up method which first assigns bubbles to a large number of discrete points along the medial axis and then merges bubbles with their neighbors to generate increasingly higher levels in the tree structure until the root is reached.

The bubble transform method of the present invention is particularly useful since it is easily scaled from two to three or more dimensions with minimal increases in the computational complexity.

A machine in accordance with the invention includes a memory for storing data in a structure which represents at least one bubble hierarchy as well as computational means which calculate the positions of bubbles which represent an object in accordance with the foregoing methods.

DESCRIPTION OF THE DRAWINGS

The invention can be understood with reference to the attached drawings in which.

DESCRIPTION OF THE PREFERRED EMBODIMENTS

The Appendix contains a listing, in c source code, of computer programs which implement the invention.

Skeletonization is a known operation in image processing. Its importance lies in the data reduction of a set of image points to a set of line segments, the "medial axis" or skeleton. In the continuous case the medial axis of an object is defined to be a line with the same topology as the object itself connecting points which lie midway between boundary centers of the object. In the discrete case, the medial axis satisfies four conditions: it has the same connectedness as the object; it is one pixel thick; it preserves the end points; and it lies in the middle of the object.

Figure 1:
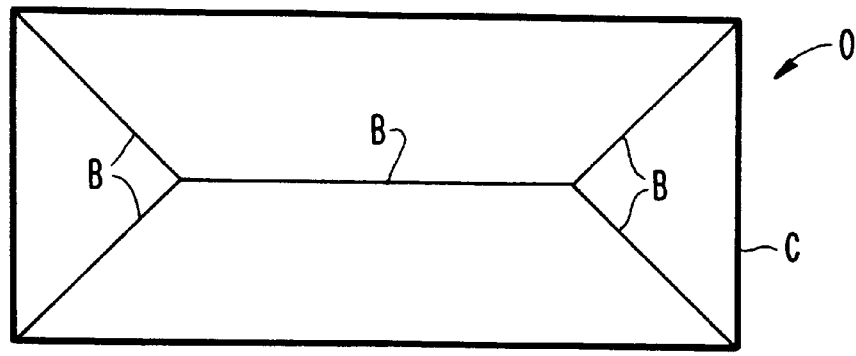
FIG. 1 conceptually illustrates the medial axis of an object.

FIG. 1 illustrates the medial axis of a two dimensional rectangular object O having a contour C. The medial axis consists of a group of five connected line segments or branches B. Further properties of the medial axis, together with various algorithms for calculating its coordinates, are described in "Path Planning In a Three Dimensional Environment", Ruff and Ahuja, IEEE Catalog, No. 84CH2046-1, 1984 and in "Improved Metrics In Image Processing Applied To The Hilditch Skeleton", Verwer, IEEE Catalog, No. CH2614-6/88/0000/0137.

In a preferred embodiment which is implemented in routines with the prefix "BUSK" listed in the Appendix, the medial axis is calculated using the Hilditch Skeletonization method by testing Hilditch conditions each time all pixels with a certain distance value have been stored. The calculation uses a bucket sort with directional information for improved efficiency. The invention is not limited, however, to any specific algorithms for the calculation of medial axis coordinates.

In many applications of bubble hierarchies in collision avoidance and robotics, the contours of objects are accurately known and pre-digitized, since the objects are often designed and produced using computer aided design (CAD) data bases. The position of the medial axis can then be calculated directly without the necessity for first determining a bubble placement geometry, as taught by O'Rourke and Badler (supra).

In accordance with the invention, a bubble hierarchy representing an object is derived by placing bubbles on the medial axis of the object.

Figure 2:
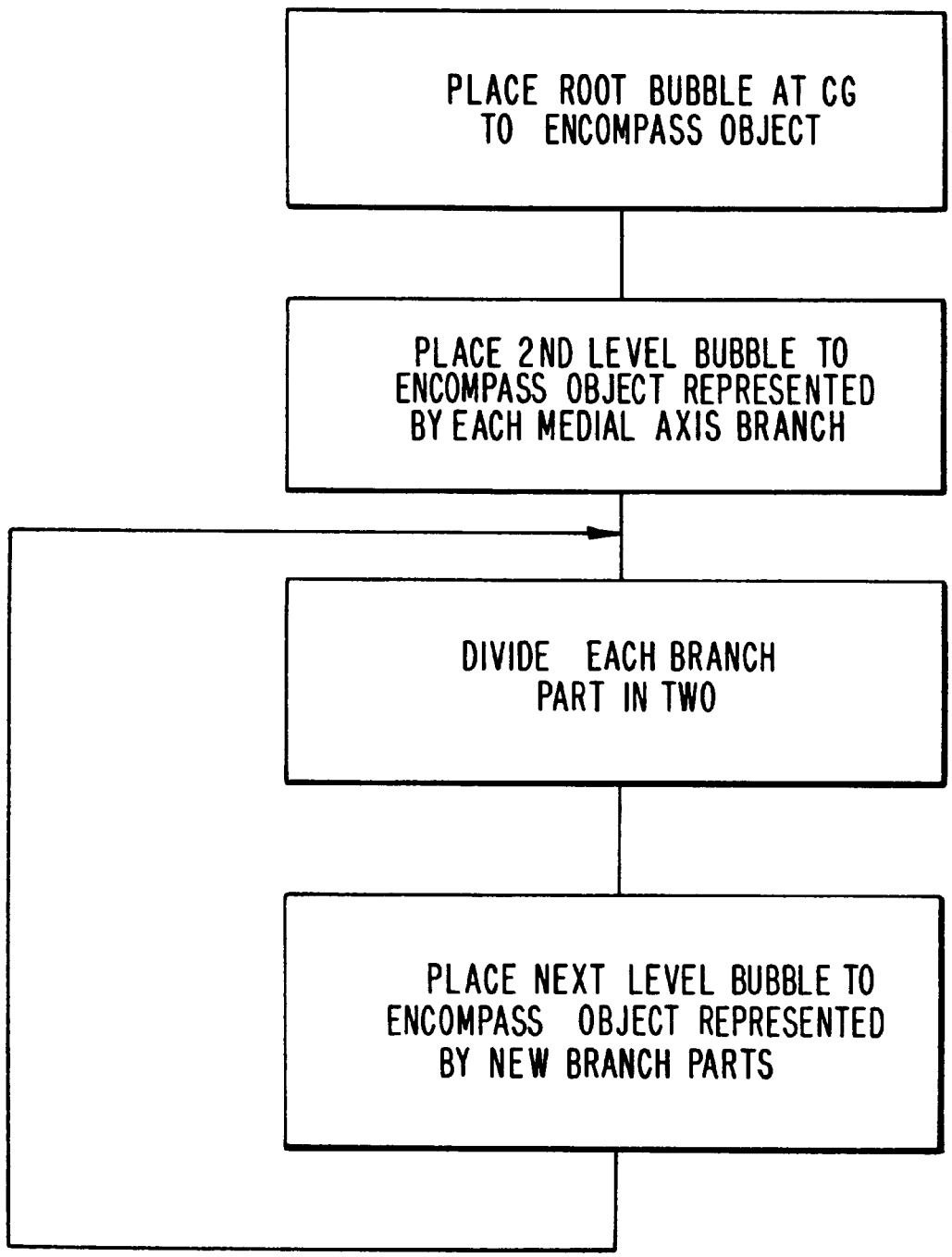
FIGS. 2 and 3*b* are flow charts of a top down method for placing bubbles along the medial axis.

In a first embodiment utilized to generate the bubble hierarchy, as illustrated in FIG. 2, the root bubble is first placed around the center of gravity of the object and has a radius equal to the maximum distance from the center of gravity to the contour. The first level successors of the root bubble each encompass the object parts described by the branches of the medial axis. Each next level of the hierarchy cuts each branch in two to yield two new bubbles which better represent the object.

Figure 3A:
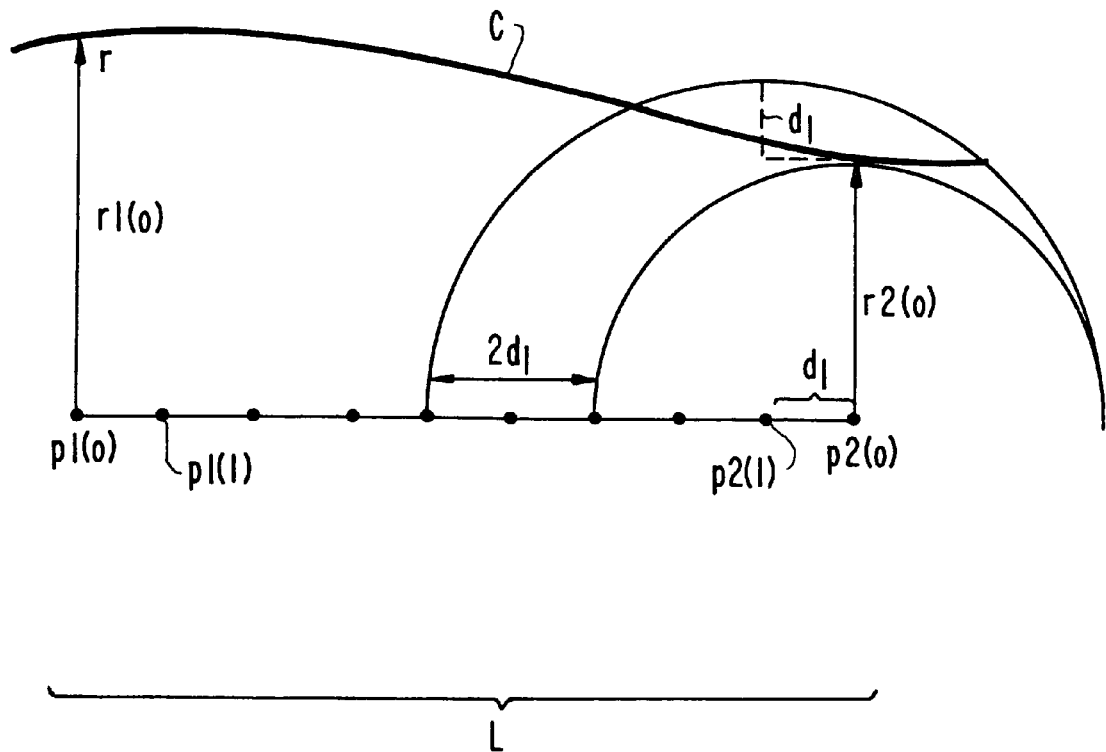
FIG. 3*a* illustrates the geometry used in the program of FIG. 3*b;*
Figure 3B:
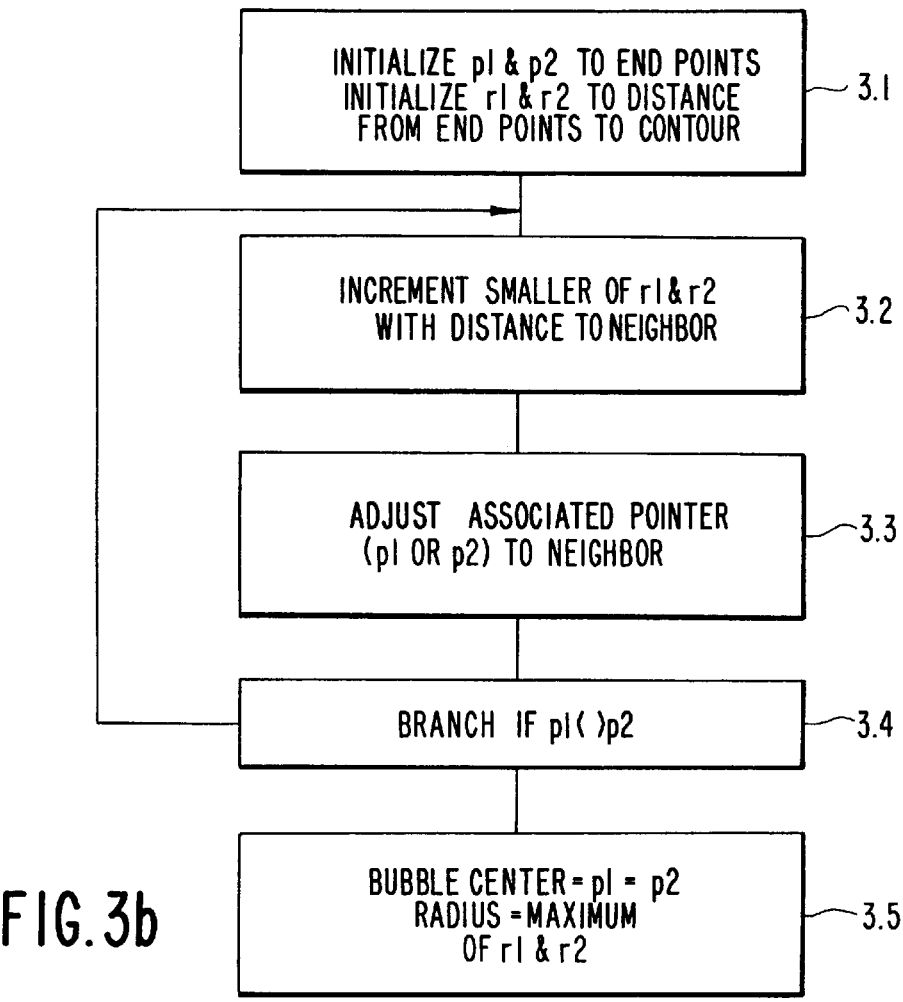

The method is illustrated in a two-dimensional geometry with reference to FIG. 3a, for each line piece L of the medial axis branch, the following procedure, illustrated in the flow chart of FIG. 3b, is used to define the encompassing bubble.

The line segment is first represented as a list of discrete medial axis points.

3.1 Two pointers, p1 and p2 are initialized, respectively, to the beginning p1(o) and end p2(o) of the list. Pointer p1 has a variable r1 associated with it which is initialized to the value r1(o) of the distance from the point at the start of the list to the contour while pointer p2 has a variable r2 associated with it which is initialized to the value r1(o) of the distance from the point at the end of the list to the contour.

3.2 The values of the variables r1 and r2 are compared and the variable having the lowest value is incremented by the distance to the respective next element in the list.

3.3 The associated pointer, p1 or p2 is adjusted to point to the next or previous element.

3.4 The process stops if p1 points to the same element as p2.

3.5 The bubble encompassing geometry represented by the line segment of the medial axis has its center at the point on the line indicated by p1 and p2 and has a radius equal to the maximum of the values of r1 and r2.

The top-down method is implemented in two dimensions as "bubble.c" in the Appendix.

A second, alternate method for placing bubbles on the medial axis starts at the lowest (finest representation) level of the bubble hierarchy and combines bubbles form the bottom-up until the root bubble is generated.

The medial axis is divided into a large number of discrete points and a bubble is assigned to each point, the center of the bubble being located at the point and the radius of the bubble being equal to the distance from the point to the contour.

The smallest bubble generated in the previous step is combined with its smallest neighbor or neighbors to generate a new bubble and the process is repeated until the root bubble is found.

Figure 4:
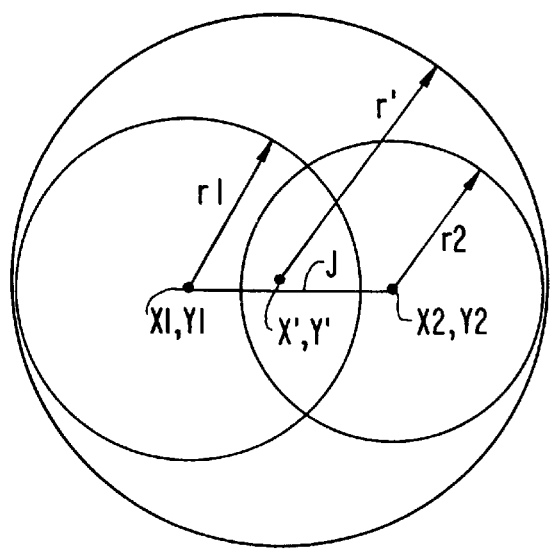
FIG. 4 illustrates the geometry used in a bottom-up method for placing bubbles.

With reference to FIG. 4 (two dimensions), the merge operation finds a new bubble from two old bubbles with the following formulas:

$$r' = (r1 + j + r2)/2$$

$$x' = 1/2\left(x1 + x2 + \frac{r1 - r2}{j}(x1 - x2)\right)$$

$$y' = 1/2\left(y1 + y2 + \frac{r1 - r2}{j}(y1 - y2)\right)$$

$$z' = 1/2\left(z1 + z2 + \frac{r1 - r2}{j}(z1 - z2)\right);$$

where r' is the new radius, r1 and r2 are the radii of the old bubbles and j is the distance between the centers of the old bubbles, (x',y',z') are the three dimensional coordinates of the center of the new bubble, and (x1,y1,z1) and (x2,y2,z2) are the coordinates of the respective centers of the old bubbles.

The bottom-up method is implemented as "blower.c" in the Appendix.

The bubble placement method of the present invention has an advantage over those of the prior art in that it is essentially dependent only on distance calculations and may thus be readily expanded as the dimensionality of the system increases without substantial increase in the complexity of the calculation.

Figure 5:
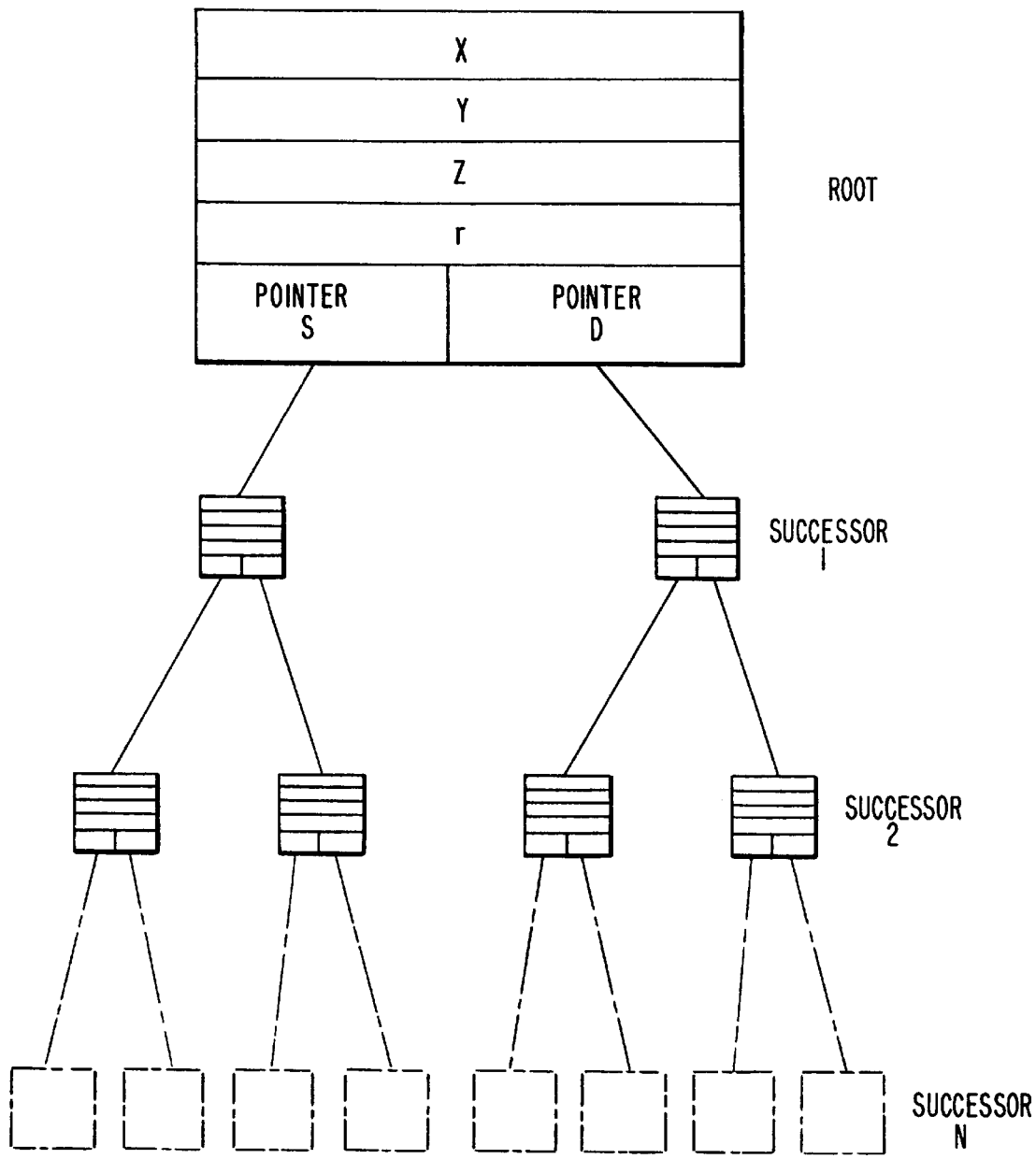
FIG. 5 is a data structure for representing a bubble hierarchy.

FIG. 5 represents a data structure for a bubble hierarchy in a computer. Each bubble is represented as a record which includes variables specifying the coordinates of the bubble center, the bubble radius, and pointers to the successor bubbles in the hierarchy tree.

```
 1    #define TRUE 1
 2    #define FALSE 0
 3    #define MAX 32767
 4    #define PIXEL short
 5
 6    #include <stdio.h>
 7
 8    /*
 9     * Structure BUCK desribes a bucket structure with variable bu
                                                         ->cket size.
10     * The number of buckets should be a power of 2 (fast modulo po
                                                         ->ssible).
11     * For each bucket the first chunk is fixed: 'pchunk1' is an ar
                                                         ->ray of
12     * pointers to these first chunks.
13     *
14     * New chunk allocation is regulated with 'freecount' and 'free
                                                         ->chunk'.
15     * If a new chunk is requested and 'freechunk' is larger than z
                                                         ->ero, a
16     * linear search is started at 'firstchunk'; if 'freechunk is z
                                                         ->ero, a new
17     * chunk is appended at the end. The total number of allocated
                                                         ->chunks
18     * in the linear list is counted in 'allocated'.
19     *
20     * The user should supply 6 variables in the procedures. For wr
                                                         ->iting 2
21     * variables pointing to the node which may be written next and
                                                         -> to the
22     * last node of the chunk. For reading idem. The variables shou
                                                         ->ld have
23     * the names 'pnw','pnwe','pnr','pnre' (registers!). An externa
                                                         ->l buck should
24     * be present with the name "b". Reading is controlled by the v
                                                         ->ariable "go".
25     *
26     * Writing starts with the macro 'startwrite(bucket)' and end w
                                                         ->iths
27     * 'closewrite(pnw)'. Reading starts with startread(bucket). Re
                                                         ->ading
28     * a pointer and a direction is done with RCL(pointer,direction
                                                         ->), reading
29     * only a pointer with RCLP(pointer). Writing is done with STR(
                                                         ->pointer,
30     * direction) and STRP(pointer). If a bucket is read and writte
                                                         ->n in
31     * simultaneously use the test while(pnr != pnw) instead of whi
                                                         ->le(go)
     */
32
33    typedef struct BUCK buck;
34    typedef struct CHUNK chunk;
35    typedef struct NODE node;
36
37
38    struct BUCK {
39      int nbuckets;                  /* Number of buckets */
40      unsigned int chunksize;        /* Size of chunk (#nodes) */
41      unsigned int sizeofchunk;      /* Size of chunk (in bytes, total
                                                         ->structure) */
42      int andmask;                   /* Andmask for modulo operation */
43      int rbuck;                     /* Number of bucket which is being
                                                         -> read */
44      int wbuck;                     /* Number of bucket in which nodes
                                                         -> are being put */
45      chunk *pwritechunk;            /* Pointer to chunk being written
                                                         ->in */
46      chunk *preadchunk;             /* Pointer to chunk being read */
47      node **plastnode;              /* Array pointers to last nodes+1
                                                         ->of each bucket */
48      chunk **pchunk1;               /* Array pointers to first chunk o
                                                         ->f each bucket */
49      chunk *firstchunk;             /* First allocated chunk */
50      chunk *lastchunk;              /* Last allocated chunk */
51      chunk *freechunk;              /* Last freed chunk */
52      int freecount;                 /* Number of free chunks */
53      int allocated;                 /* Number of chunks allocated
                                                         ->tra */
54    };
55    /*
56     * Structure CHUNK consists of one flag and two pointers. The f
                                                         ->lag
57     * is used to denote if a chunk is busy.
58     * The chunkpointers point to respectively the next chunk of th
                                                         ->e current
59     * bucket and the next chunk which was allocated.
60     */
61    struct CHUNK {
62      unsigned char used;            /* TRUE if chunk currently used */
63      chunk *bnext;                  /* pointer to next chunk of current buc
                                                         ->ket */
64      chunk *lnext;                  /* pointer to next allocated chunk */
65      /* Nodes are put here (variably sized array) */
66    };
67    /*
68     * structure node is used to store the wavefronts. pc points
69     * to the place of the wavefront, dirc to the direction from
70     * which the wavefront was generated. direction codes are:
71     *
72     *      11 13 15
73     *      12 14  0  1
74     *       9 10  2  3
75     *       8  6  4  5
76     *       7
77     *
78     * the edges are coded with the next four macro's, used if eros
79     * the edges is necessary.
                                                         ->ion from
``` eusk.h

```
 84   */
 85
 86   #define EAST   2
 87   #define SOUTH  6
 88   #define WEST   10
 89   #define NORTH  14
 90
 91   struct NODE {
 92      PIXEL *pim;
 93      unsigned char dirc;
 94   };
 95
 96   /* declarations of functions */
 97
 98   buck *buckcreate();
 99   void buckdelete();
100   unsigned char buckempty();
101   chunk *getchunk();
102
103   /* macros for reading and writing nodes */
104
105   #define STR(pointer,direction) \
106      (pnw->pim = (pointer); pnw++->dirc = (unsigned char)(direction);\
107      if (pnw == pnwe) nextwrite;}
108
109   #define STRP(pointer) (pnw++->pim = (pointer);\
110      if (pnw == pnwe) nextwrite;}
111
112   #define RCL(pointer,direction) \
113      ((pointer) = pnr->pim; (direction) = pnr++->dirc; \
114      if (pnr == pnre) {\
115      if (pnr == b->plastnode[b->rbuck]) go = FALSE;\
116      else nextread;}}
117
118   #define RCLP(pointer) \
119      ((pointer) = pnr++->pim;\
120      if (pnr == pnre) {\
121      if (pnr == b->plastnode[b->rbuck]) go = FALSE;\
122      else nextread;}}
123
124   /* macros called if a complete chunk has been read or written */
125
126   #define startwrite(bucknr)\
127      (b->wbuck = (bucknr)&b->andmask;\
128      b->pwritechunk = b->pchunkl[b->wbuck];\
129      pnw = (node *) (b->pwritechunk + 1);\
130      pnwe = pnw + b->chunksize;}
131
132   #define nextwrite \
133      (b->pwritechunk->bnext = getchunk(b);\
134      b->pwritechunk = b->pwritechunk->bnext;\
135      if (b->pwritechunk == (chunk *)NULL) (buckdelete(b); return(-1);}\
136      pnw = (node *) (b->pwritechunk + 1);\
137      pnwe = pnw + b->chunksize;}
138
139   #define closewrite(pnode) \
140      (b->pwritechunk->bnext = (chunk *) NULL;\
141      b->plastnode[b->wbuck] = (pnode);}
142
143   #define startread(bucknr) \
144      (b->rbuck = (bucknr)&b->andmask;\
145      b->preadchunk = b->pchunkl[b->rbuck];\
146      pnr = (node *) (b->preadchunk + 1);\
147      go = TRUE;\
148      if (b->preadchunk->bnext == (chunk *)NULL){\
149      pnre = b->plastnode[b->rbuck];\
150      if (pnr == pnre) go = FALSE;}\
151      else pnre = pnr + b->chunksize;}
152
153   #define nextread \
154      (b->preadchunk = b->preadchunk->bnext;\
155      pnr = (node *) (b->preadchunk + 1);\
156      go = TRUE;\
157      if (b->preadchunk->bnext == (chunk *)NULL){\
158      pnre = b->plastnode[b->rbuck];\
159      if (pnr == pnre) go = FALSE;}\
160      else pnre = pnr + b->chunksize;}
161
```

```
1   #include "eusk.h"
2
3   /*
4    * put all background pixels 4-c to an object pixel in bucket 0
5    */
6   euskzero(b,pimb,mi,edge,sizex,sizey,width)
7   buck *b;
8   register PIXEL *pimb;
9   register PIXEL mi;
10      int edge;
11      int sizex;
12      int sizey;
13      int width;
14  {
15      register PIXEL *pim;
16      register node *pnw;
17      register node *pnwe;
18
19      register int i;
20      int j;
21
22      startwrite(0);
23
24      /* all background pixels 4-c to object in bucket 0 */
25      for(j=2; j<(sizey-2; j++) {
26          pim = pimb+j*width+2;
27          for (i = sizex-4; --i>=0; pim++) {
28              if ((*pim & mi) == 0) {
29                  if ((*(pim+1) & mi)  ||
30                      (*(pim-1) & mi)  ||
31                      (*(pim+width) & mi) ||
32                      (*(pim-width) & mi)) STR(pim,0);}}
33
34      /* if applicable, idem for edge pixels */
35      if (edge == 0) {
36          for(pim=pimb+2*width+2, i=sizex-4; --i>=0; pim++)
37              if (*pim & mi) STR(pim-width,NORTH);
38          pim = pimb+i*width+2;
39          for(pim=pimb+(sizey-3)*width+2, i=sizex-4; --i>=0; pim++)
40              if (*pim & mi) STR(pim-width,SOUTH);
41          for(i=2; i<sizey-2; i++) {
42              pim = pimb+i*width+2;
43              if (*pim & mi) STR(pim-1,WEST);
44              pim += sizex-5;
45              if (*pim & mi) STR(pim+1,EAST);}}
46
47      closewrite(pnw);
48
49      return(0);
50  }
51  /*
52   * give the outmost 2 pixels of the image value "edge" (0 or 1)
53   */
54  euskedge(pimb,mi,edge,sizex,sizey,width)
55  register PIXEL *pimb,mi;
56      register int edge;
57      register int sizex,sizey,width;
58  {
59      register PIXEL *pim;
60      register int i;
61
62      if (edge == 0) {
63          for(pim=pimb, i=sizex; --i>=0;) *pim++ &= ~mi;
64          for(pim=pimb+width, i=sizex; --i>=0;) *pim++ &= ~mi;
65          for(pim=pimb+(sizey-2)*width, i=sizex; --i>=0;) *pim++ &= ~mi;
66          for(pim=pimb+(sizey-1)*width, i=sizex; --i>=0;) *pim++ &= ~mi;
67
68          for(j=2; j<(sizey-2); j++) {
69              pim = pimb + j*width;
70              *pim++ &= ~mi;
71              *pim++ &= ~mi;
72              pim += sizex-4;
73              *pim++ &= ~mi;
74              *pim &= ~mi; }}
75      else {
76          for(pim=pimb, i=sizex; --i>=0;) *pim++ |= mi;
77          for(pim=pimb+width, i=sizex; --i>=0;) *pim++ |= mi;
78          for(pim=pimb+(sizey-2)*width, i=sizex; --i>=0;) *pim++ |= mi;
79          for(pim=pimb+(sizey-1)*width, i=sizex; --i>=0;) *pim++ |= mi;
80
81          for(i=2; i<(sizey-2); i++) {
82              pim = pimb + i*width;
83              *pim++ |= mi;
84              *pim++ |= mi;
85              pim += sizex-4;
86              *pim++ |= mi;
87              *pim |= mi; }}
88  }
89  /*
90   * remove the inner edge, preserve connectivity
91   */
92  euskinne(pimb,mo,sizex,sizey,width)
93  register PIXEL *pimb,mo;
94      register int sizex,sizey,width;
95  {
96      register PIXEL *pim;
97      register int i;
98
99      for(pim=pimb+3*width, i=sizex-6; --i>=0; pim++)
100         if (!(*(pim+width) & mo)) *pim &= ~mo;
101     for(pim=pimb+3*(sizey-2)*width, i=sizex-6; --i>=0; pim++)
102         if (!(*(pim-width) & mo)) *pim &= ~mo;
```

```
euskaux1.c                                                                 Page: 2

106    for(i=3; i<(sizey-3); i++) {
107        pim = pimb + i*width+1;
108        if ((*(pim+1) & mo)) *pim &= ~mo;
109        pim += sizex-3;
110        if ((*(pim-1) & mo)) *pim &= ~mo;}
111
112    *(pimb+2*width)            &= ~mo;
113    *(pimb+(sizex-3)+width)    &= ~mo;
114    *(pimb+1+2*width)          &= ~mo;
115    *(pimb+(sizex-2)+2*width)  &= ~mo;
116    *(pimb+1+(sizey-3)*width)  &= ~mo;
117    *(pimb+(sizex-2)+(sizey-3)*width) &= ~mo;
118    *(pimb+2+(sizey-2)*width)  &= ~mo;
119    *(pimb+(sizex-3)+(sizey-2)*width) &= ~mo;
120
121    if (!(*(pimb+2+2*width) & mo))
122        *(pimb+1+width) &= ~mo;
123    if (!(*(pimb+(sizex-3)+2*width) & mo))
124        *(pimb+(sizex-2)+width) &= ~mo;
125    if (!(*(pimb+2+(sizey-3)*width) & mo))
126        *(pimb+1+(sizey-2)*width) &= ~mo;
127    if (!(*(pimb+(sizex-3)+(sizey-3)*width) & mo))
128        *(pimb+(sizex-2)+(sizey-2)*width) &= ~mo;
129    }
130
131    /*
132     * remove loose ends
133     */
134
135    euskrmep(pimb,mo,mp,sizex,sizey,width,lut,queuesize)
136    PIXEL *pimb;
137    register PIXEL mo, mp;
138    int sizex, sizey;
139    register int width;
140    unsigned char *lut;
141    unsigned int queuesize;
142    {
143        register PIXEL **ppw, **ppr, **ppe, *pim;
144        PIXEL **ppq, *mop=mo|mp;
145        register int x,y;
146        register unsigned char ent;
147        unsigned int qsizeac;
148        char *malloc(), *realloc();
149
150    /* allocate little queue to remove branches */
151    ppw=ppq=(PIXEL **) malloc(sizeof(PIXEL *)*queuesize);
152    if (ppq == (PIXEL **) NULL) return(-1);
153    ppe=ppq+queuesize;
154    qsizeac=queuesize;
155
156    /* find all non-breakpixels */
157    for (y=2; y<sizey-2; y++) {
158        pim = pimb+y*width+2;
159        for (x = sizex-4; --x>=0; pim++) if (*pim & mo) {
160            ent=0;
161
162            if ((*(pim+1)         ) & mo) ent |= 1;
163            if ((*(pim+1-width)   ) & mo) ent |= 2;
164            if ((*(pim  -width)   ) & mo) ent |= 4;
165            if ((*(pim-1-width)   ) & mo) ent |= 8;
166            if ((*(pim-1)         ) & mo) ent |= 16;
167            if ((*(pim-1+width)   ) & mo) ent |= 32;
168            if ((*(pim  +width)   ) & mo) ent |= 64;
169            if ((*(pim+1+width)   ) & mo) ent |= 128;
170            if (!lut[ent]) {
171                *ppw++ = pim;
172                if (ppw == ppe) {
173                    /* queue to small, increase size */
174                    qsizeac += queuesize;
175                    ppq = (PIXEL **)realloc((char *)ppq,sizeof(PIXEL *)*qsizeac);
176                    if (ppq == (PIXEL **) NULL) return(-1);
177                    ppw = ppq+qsizeac-queuesize;
178                    ppe = ppq+qsizeac;}}}}
179
180    /* eat off loose ends */
181    ppr=ppq;
182    while (ppw != ppr) {
183        pim = *ppr++; if (ppr == ppe) ppr=ppq;
184
185        /* test coordinates */
186        x=(pim-pimb)%width; y=(pim-pimb)/width;
187        if(x>1 && x<sizex-2 && y>1 && y<sizey-2) {
188
189            /* test connectivity */
190            ent=0;
191            if ((*(pim+1)         ) & mo) ent |= 1;
192            if ((*(pim+1-width)   ) & mo) ent |= 2;
193            if ((*(pim  -width)   ) & mo) ent |= 4;
194            if ((*(pim-1-width)   ) & mo) ent |= 8;
195            if ((*(pim-1)         ) & mo) ent |= 16;
196            if ((*(pim-1+width)   ) & mo) ent |= 32;
197            if ((*(pim  +width)   ) & mo) ent |= 64;
198            if ((*(pim+1+width)   ) & mo) ent |= 128;
199            if (!lut[ent]) {
200
201                *pim &= ~mo;            /* remove pixel */
202
203                                        /* next please */
204                if ((*(pim+1)         ) & mop) == mo) pim++;
205                else if ((*(pim+1+width) & mop) == mo) pim += wid
206                                                               ->th;
207                else if ((*(pim+width)   & mop) == mo) pim +=
208                                                               ->1+width;
209                else if ((*(pim-1)       & mop) == mo) pim--;
210                else if ((*(pim-1-width) & mop) == mo) pim +=
211                                                               ->1-width;
                else if ((*(pim-width)   & mop) == mo) pim += -wi
                                                               ->dth;
```

```
212             else if ((*(pim+1-width) & mop) == mo) pim += 1
213                 else continue;                      ->-width;
214
215                 *ppw++ = pim; if (ppw == ppe) {p
216                                     ->pw = ppq;}}}
217         free((char *)ppq);
218         return(0);
219     }
220
221     /*
222      * copy bitplanes
223      */
224     euskcopy(pimb,mi,mo,sizex,sizey,width)
225     register PIXEL *pimb,mi,mo;
226     register int sizex,sizey,width;
227     {
228         register PIXEL *pim;
229         register int i;
230         register int j;
231
232         for (j=0; j<sizey; j++)
233             for (pim = pimb+j*width, i=sizex; --i>=0; pim++)
234                 if (*pim & mi) *pim |= mo;
235                 else *pim &= ~mo;
236     }
237
238     /*
239      * fill the tables for the neighbourhood
240      */
241     euskneig(width,neig4,neig8,neigk,neigb)
242     register int width;
243     register int *neig4;
244     register int *neig8;
245     register int *neigk;
246     register int *neigb;
247     {
248         /*  0 */    *neig4++ =  0;
249         /*  1 */    *neig4++ = -1;
250         /*  2 */    *neig4++ = -1;
251         /*  3 */    *neig4++ = -1;
252         /*  4 */    *neig4++ =  0;
253         /*  5 */    *neig4++ =  0;
254         /*  6 */    *neig4++ = -width;
255         /*  7 */    *neig4++ = -width;
256         /*  8 */    *neig4++ = -width;
257         /*  9 */    *neig4++ =  0;
258         /* 10 */    *neig4++ =  1;
259         /* 11 */    *neig4++ =  1;
260         /* 12 */    *neig4++ =  1;
261         /* 13 */    *neig4++ =  0;
262         /* 14 */    *neig4++ =  width;
263         /* 15 */    *neig4   =  width;

266         /*  0 */    *neig8++ = -1+width;
267         /*  1 */    *neig8++ = -1+width;
268         /*  2 */    *neig8++ =  0;
269         /*  3 */    *neig8++ = -1-width;
270         /*  4 */    *neig8++ = -1-width;
271         /*  5 */    *neig8++ = -1-width;
272         /*  6 */    *neig8++ =  0;
273         /*  7 */    *neig8++ =  1-width;
274         /*  8 */    *neig8++ =  1-width;
275         /*  9 */    *neig8++ =  1-width;
276         /* 10 */    *neig8++ =  0;
277         /* 11 */    *neig8++ =  1+width;
278         /* 12 */    *neig8++ =  1+width;
279         /* 13 */    *neig8++ =  1+width;
280         /* 14 */    *neig8++ =  0;
281         /* 15 */    *neig8   = -1+width;

284         /*  0 */    *neigk++ =  0;
285         /*  1 */    *neigk++ = -2+width;
286         /*  2 */    *neigk++ =  0;
287         /*  3 */    *neigk++ = -2-width;
288         /*  4 */    *neigk++ =  0;
289         /*  5 */    *neigk++ = -1-2*width;
290         /*  6 */    *neigk++ =  0;
291         /*  7 */    *neigk++ =  1-2*width;
292         /*  8 */    *neigk++ =  0;
293         /*  9 */    *neigk++ =  2-width;
294         /* 10 */    *neigk++ =  0;
295         /* 11 */    *neigk++ =  2+width;
296         /* 12 */    *neigk++ =  0;
297         /* 13 */    *neigk++ =  1+2*width;
298         /* 14 */    *neigk++ =  0;
299         /* 15 */    *neigk   = -1+2*width;

301         /*  0 */    *neigb++ =  1-width;
302         /*  1 */    *neigb++ =  2-width;
303         /*  2 */    *neigb++ =  1;
304         /*  3 */    *neigb++ =  2+width;
305         /*  4 */    *neigb++ =  1+width;
306         /*  5 */    *neigb++ =  1+2*width;
307         /*  6 */    *neigb++ = -1+2*width;
308         /*  7 */    *neigb++ = -1+2*width;
309         /*  8 */    *neigb++ = -2+width;
310         /*  9 */    *neigb++ = -1;
311         /* 10 */    *neigb++ = -2-width;
312         /* 11 */    *neigb++ = -1-width;
313         /* 12 */    *neigb++ = -1-2*width;
314         /* 13 */    *neigb++ = -width;
315         /* 14 */    *neigb++ =  1-2*width;
316         /* 15 */    *neigb   =  1-2*width;
318     }
``` euskbuck.c                                Page:1

```
 1  /*
 2   * *** Library PATH: bucket structure manager ***
 3   *
 4   *
 5   *
 6   *
 7   *
 8   *
 9   * The routines in this module manage a bucket structure, in wh
10   *                                                    ->ich the buckets
     * may have variable size. The buckets store nodes (specified i
                                                          ->n eusk.h).
11   * Programs using the bucket structure should include "eusk.h".
12   *
13   * Functions:
14   *
15   * buckcreate(nb,chunksize)
16   *   Create a bucket structure with nb buckets;
17   *   A bucket will be built of 'chunks', with size 'chunksize'.
18   *   Returns NULL if there is not enough memory, else a buckpoint
                                                          ->er.
19   *
20   * buckempty(b)
21   *   Return TRUE if all buckets are empty.
22   *
23   * buckinit(b)
24   *   Free all buckets
25   *
26   * buckfree(b,i)
27   *   Free one bucket.
28   *
29   * buckdelete(b)
30   *   Free allocated memory.
31   *
32   * getchunk(b)
33   *   Find a free chunk or allocate a new one.
34   *   Returns NULL-pointer if there is no memory left.
35   */
36
37  #include "eusk.h"
38
39  buck *buckcreate(nb, chunksize)
40  register int nb;
41  register unsigned int chunksize;
42  {
43      register chunk **ppc;
44      register node **ppn;
45      register int i;
46      char *calloc();
47      register buck *b;
48
49      if ((nb&(nb-1)) != 0) return(NULL);
50
51      if ((b = (buck *)calloc(1,sizeof(buck))) == (buck *)NUL
                                                    ->L) return((buck *)NULL);
52      b->nbuckets = nb;
53      b->chunksize = chunksize;
54      b->sizeofchunk = sizeof(chunk) + chunksize*sizeof(node);
55      b->andmask = nb-1;
56
57      /* Allocate the first chunk of each bucket and set up an arr
                                                    ->ay of
58         pointers to these first chunks. */
59
60      ppc = b->pchunk1 = (chunk **) calloc((unsigned int)nb,sizeof
                                                    ->(chunk *));
61      if (ppc == (chunk **)NULL) return((buck *)NULL);
62      for (i=0; i<nb; i++) {
63          *ppc = (chunk *) calloc((unsigned int)b->sizeofchunk,1);
64          if (*ppc++ == (chunk *)NULL) return((buck *)NULL);
65      }
66
67      /* Allocate an array with pointers for the last nodes writte
                                                    ->n */
68
69      ppn = b->plastnode = (node **) calloc((unsigned int)nb,sizeo
                                                    ->f(node *));
70      if (ppn == (node **)NULL) return((buck *)NULL);
71      for (i=0; i<nb; i++) {
72          *ppn++ = (node *)(b->pchunk1[i] + 1);
73          b->pchunk1[i]->bnext = (chunk *)NULL;
74      }
75
76      /* Set up free allocation variables */
77
78      b->firstchunk = (chunk *) NULL;
79      b->lastchunk = (chunk *) NULL;
80      b->freechunk = (chunk *) NULL;
81      b->freecount = 0;
82
83      return(b);
84  }
85
86  buckfree(b,i)
87  register buck *b;
88  register int i;
89  {
90      register chunk *pc;
91
92      b->plastnode[i&b->andmask] = (node *)(b->pchunk1[i&b->andmas
                                                    ->k]+1);
93      pc = b->pchunk1[i&b->andmask]->bnext;
94      if (pc != (chunk *)NULL) b->freechunk=pc;
95      while (pc != (chunk *)NULL) {
96          pc->used = FALSE;
97          b->freecount++;
98          pc = pc->bnext;
99      }
100 }
``` buskbuck.c                                                                      Page:2

```
103    unsigned char buckempty(b)
104    register buck *b;
105    {
106        register int i;
107
108        for (i = 0; i < b->nbuckets; i++)
109            if (b->plastnode[i] != (node *)(b->pchunkl[i] + 1))
110                return(FALSE);
111
112        return(TRUE);
113    }
114
115    void buckdelete(b)
116    buck *b;
117    {
118        register chunk *pc, *pcn;
119        register int i;
120
121        if (b == (buck *)NULL) return;
122
123        if (b->pchunkl != (chunk **)NULL) {
124            for (i=0; i<b->nbuckets; i++)
125                if (b->pchunkl[i] != (chunk *)NULL)
126                    free((char *)b->pchunkl[i]);
127            free((char *)b->pchunkl);
128        }
129
130        if (b->plastnode != (node **)NULL) {
131            free((char *)b->plastnode);
132        }
133        pc=b->firstchunk;
134        if (b->firstchunk != NULL) {
135            do {
136                pcn = pc->lnext;
137                if (pc != (char *)NULL) {
138                    free((char *)pc);
139                }
140                pc = pcn;
141            } while (pc!=(char *)b->firstchunk);
142        }
143        free((char *)b);
144    }
145
146
147    chunk *getchunk(b)
148    register buck *b;
149    {
150        register chunk *newchunk;
151        char *calloc();
152        register int i,j;
153
154        if (b->freecount > 0) {
155            newchunk = b->freechunk;
156            while (newchunk->used) newchunk = newchunk->lnext;
157            b->freecount--;
158            b->freechunk=b->freechunk->lnext;}
159        else {
160            newchunk = (chunk *) calloc((unsigned int)b->sizeofchunk,
                                                                      ->1);
161            if (newchunk == (chunk *) NULL) return((chunk *)NULL);
162            if (b->firstchunk == (chunk *) NULL) b->firstchunk = newc
                                                                      ->hunk;
163            else b->lastchunk->lnext = newchunk;
164            b->lastchunk = newchunk;
165            newchunk->lnext = b->firstchunk;
166        }
167        newchunk->used = TRUE;
168        return(newchunk);
169    }
170
```

```
euskproc.c                                                                   Page: 1

1    #include "eusk.h"
 2
 3    /****************************************************************
 4     *                                                        ->*****
 5     * Description:
 6     * purpose:         calculate an accurate skeleton.
 7     * principle:       address pixels in order of increasing distan
 8     *                                                           ->ce.
 9     * Implementation:  test Hilditch conditions to preserve topolog
10     *                                                           ->y.
11     *                  store directional information to achieve spe
12     *                                                           ->ed.
13     *
14     * Arguments:
15     * pimb1:           pointer to upper left corner of binary image
16     *                                                    -> (bitplanes).
17     * pimb2:           pointer to upper left corner of output image
18     *                                                    -> (distances).
19     *
20     *                  if NULL distances are not written.
21     * mi:              input mask in first image.
22     * mo:              output mask in first image.
23     * mp:              temporary bitplane in first image.
24     * end:             endpixel condition (-1,0,1,2 or 3).
25     *                  -1: loose end are eaten away.
26     *                   0: "natural" endpixel condition of this alg
27     *                                                           ->orithm.
28     *                   1,2,3: extra endpixels are hold, number of n
29     *                                                           ->eighbours.
30     * edge:            0 or 1.
31     * d4:              distance to 4-connected neighbours.
32     * d8:              distance to 8-connected neighbours.
33     * dk:              distance to neighbours reachable with a knig
34     *                                                           ->ht's move.
35     * distmax:         maximum distance to be treated, if 0 infinit
36     *                                                           ->y is assumed.
37     * sizex:           size of image along x-axis.
38     * sizey:           size of image along y-axis.
39     * width:           offset along x-axis from top of image memory
40     *                                                           ->.
41     * chunksize:       number of nodes per chunk.
42     * queuesize:       number of pointers on queue (initially).
43     *
44     * Return values:
45     *   0 successfull completion
46     *  -1 memory shortage
47     *
48     * Warning:
49     *  Arguments are not checked, absolutely necessary are positive
50     *                                                           -> chunk- and
51     *  queuesizes, non-overlapping bitplanes masks and valid distan
52     *                                                           ->ce coefficients.
53     *
54     *
55     *
56     *
57     /*
58     * Hilditch conditions, respectively with 0,1,2 and 3 neighbour
59     *                                                           ->s
60     * required for the preservation of endpixels
61     */
62     static unsigned char luthil[4][256] = {{
63     1,0,0,0,0,0,0,0,0,1,1,1,0,0,0,0,0,1,1,0,0,0,0,0,1,1,0,0,0,0,0,0,
64     0,1,1,0,1,0,1,1,1,1,1,1,1,1,1,0,1,0,0,0,0,1,1,0,0,0,1,0,1,0,0,1,
65     0,0,1,0,1,0,1,1,1,1,1,1,1,1,1,0,1,0,0,0,0,1,1,0,0,0,1,0,1,0,0,1,
66     0,0,1,0,1,0,1,1,1,1,1,1,1,1,1,0,0,0,0,1,1,0,1,1,1,1,1,1,1,1,0,1,0,
67     1,1,1,1,0,1,0,1,1,1,1,1,1,1,1,1,0,1,0,1,1,1,1,1,1,1,1,1,1,1,0,1,0,
68     0,0,1,0,1,0,1,1,1,1,1,1,1,1,1,0,0,0,0,1,1,0,0,0,1,1,1,1,0,0,0,0,
69     0,0,1,0,0,0,0,1,1,1,1,1,1,0,1,1,1,0,0,0,0,0,0,0,1,1,0,1,0,0,0,0,
70     1,1,1,1,0,1,0,1,1,1,1,1,1,0,1,1,0,0,0,0,0,0,1,1,0,1,0,0,0,0,0,0,
71     1,0,1,0,1,0,1,1,1,1,0,1,1,1,1,0,0,0,0,0,1,0,0,0,1,0,1,0,0,1,0,1
```

```
euskproc.c                              Page:2

81  0,0,1,0,1,0,1,0,1,1,1,1,0,0,0,1,0,0,0,1,0,0,0,1,0,0,0,1,
 82  1,0,1,0,1,0,1,0,1,1,1,1,0,1,1,1,1,1,1,1,1,1,1,1,1,1,0,1,0,
 83  1,1,1,1,1,1,1,1,1,1,1,1,1,1,1,1,1,1,1,1,1,1,1,1,1,1,1,1,0,
 84  0,0,1,0,1,0,1,0,1,1,1,1,0,0,0,1,0,0,0,1,0,0,0,1,0,0,0,1,0
 85  0,0,1,0,1,0,1,0,1,1,1,1,0,1,1,1,1,1,1,1,1,1,1,1,1,0,0,0,0,
 86  },{
 87  1,1,1,1,0,1,0,1,1,1,1,1,1,1,1,1,1,1,1,1,0,0,0,0,1,1,0,0,0,
 88  1,1,1,1,1,1,0,1,0,1,1,1,1,1,1,1,1,1,0,0,0,0,1,1,1,0,0,0,0,
 89  1,0,1,0,1,0,1,0,1,1,1,1,0,0,1,1,1,1,0,0,0,1,0,0,0,1,0,1,0,
 90  1,0,1,0,1,0,1,0,1,1,1,1,0,0,0,1,0,1,0,1,0,0,0,1,0,0,0,1,0,
 91  1,1,1,1,1,0,1,0,1,1,1,1,1,1,1,1,1,1,1,0,0,0,0,1,1,0,0,0,0,
 92  1,1,1,1,1,1,1,1,1,1,1,1,1,1,1,1,1,1,0,0,0,0,1,1,1,0,0,0,0,
 93  1,0,1,0,1,0,1,0,1,1,1,1,0,0,1,1,0,0,1,0,0,1,0,1,0,1,0,1,0,1
 94  0,0,1,0,1,0,1,0,1,1,1,1,0,1,0,0,0,1,0,1,0,1,0,0,0,1,0,0,1
 95  ),{
 96  1,1,1,1,1,1,1,0,1,1,1,1,1,1,1,1,1,1,1,0,0,0,0,1,1,0,0,0,
 97  1,1,1,1,1,1,0,1,0,1,1,1,1,1,1,1,1,1,0,0,0,0,1,1,1,0,0,0,0,
 98  1,0,1,0,1,0,1,0,1,1,1,1,0,0,0,1,0,1,0,1,0,0,0,1,0,0,0,1,0,
 99  1,0,1,0,1,0,1,0,1,1,1,1,0,0,0,1,0,0,0,1,0,0,0,1,0,1,0,1,0,1
100  1,1,1,1,1,0,1,0,1,1,1,1,1,1,1,1,1,1,1,0,0,0,0,1,1,1,0,1,0
101  1,1,1,1,1,1,1,0,1,1,1,1,1,1,1,1,1,1,1,1,0,0,0,0,1,1,1,0,1,0
102  1,1,1,1,0,1,0,1,0,1,1,1,1,0,0,0,1,0,0,0,1,0,0,0,1,0,0,1,0,
103  1,0,1,0,1,0,1,0,1,1,1,0,1,0,0,1,0,0,0,1,0,0,0,1,0,0,0,1,0,
104  }};
105
106  #define DIS if(byte) *(pimb2+(pim-pimb1) |= (m1 & MAX)
107
108  eusk(pimb1,pimb2,mi,mo,mp,end,edge,d4,d8,dk,distmax,sizex,sizey
109  PIXEL *pimb1,*pimb2,*mi,*mo,*mp,*end,*edge,*d4,*d8,*dk,*distmax;
110  int end,edge,sizex,sizey;
111  register int width;
112  unsigned int chunksize, queuesize;
113  {
114      register node *pnr;              /* where to read in bucket */
115      register node *pnw;              /* where to write in bucket */
116      register node *pnre;             /* where to end reading */
117      register node *pnwe;             /* where to end writing */
118
119      register PIXEL *pim;             /* image pointer */
120      PIXEL dist;                      /* current distance */
121      register PIXEL m1;               /* register for general pur
122                                                             ->poses */
123      register PIXEL m2;               /* register for general pur
124                                                             ->poses */
125      register unsigned char byte;     /* regist  for general pur
126                                                             ->poses */
127      register unsigned char dirc;     /* direction of central pix
128                                                             ->el */
129      register unsigned char go;       /* TRUE if still nodes to b
                                                                ->e read */
         unsigned char bug;
130      unsigned char *luthile;          /* pointer to Hilditch tabl
                                           ->e, preserve endpixels */
131      unsigned char *luthiln;          /* pointer to Hilditch tabl
                                           ->e, do not preserve endpixels */
132      unsigned char show;              /* FALSE if pimb2 == NULL */
133
134      int nbuckets;                    /* number of buckets */
         int neig4[16];                  /* successors 4-connected n
                                                                ->eighbours */
135      int neig8[16];                   /* successors 8-connected n
                                                                ->eighbours */
136      int neigk[16];                   /* successors knight's move
                                                                -> neighbours */
137      int neigb[16];                   /* predecessors */
138
139                                             buck *b;
140
141      /* endpixel condition */
142
143      if (end == 1) luthile = &luthil[1][0];
144      else if (end == 2) luthile = &luthil[2][0];
145      else if (end == 3) luthile = &luthil[3][0];
146      else luthile = &luthil[0][0];
147      luthiln = &luthil[0][0];
148
149      /* distance values visible or not? */
150      if (pimb2 == NULL) show = FALSE; else show = TRUE;
151
152      /* preliminaries: edge treatment and bitplane copies */
153      euskedge(pimb1,mi,edge,sizex,sizey,width);
154      if (show) euskedge(pimb2,MAX,edge,sizex,sizey,width);
155      euskcopy(pimb1,mi,mo,mp,sizex,sizey,width);
156      euskedge(pimb,mp,0,sizex,sizey,width);
157
158      /* fill Lables neig4[], neig8[], neigk[] */
         eusknei(width, neig4, neig8, neigk, neigb);
```

```
euskproc.c                    Page:3

159
160   /* calculate required number of buckets */
161   for (nbuckets=2; nbuckets <= dk; nbuckets *= 2);
162
163   /* create bucket structure buckets (-1 means not enough memory) */
164   if ((b = buckcreate(nbuckets,chunksize)) == (buck *)NULL) {
165       buckdelete(b);
166       return(-1);
167   }
168
169   /* fill bucket 0 */
170   if (euskzero(b,pimb1,m1,edge,sizex,sizey,width) == -1) return(-1);
171
172   /* generate distances */
173   for (dist = d4; !buckempty(b) && (dist <= distmax || distmax
174                                    -> = 0); dist++)
175   {
176       /* Store pixels which are subject to removal this iteration
177          bucket "dist". Remove mask mp immediately to prevent double storage. */
178
179       /* register shuffle */
180       m1 = dist;
181       m2 = mp;
182       byte = show;
183
184       startwrite(m1);
185
186       startread(m1-d4);
187       if (m1 == d4) while (go) {
188           RCLP(pim);
189           pim++;
190                       if (*pim & m2) {DIS; *pim &= ~m2;
191                                        ->; STR(pim,10);}
192           . pim -= 2;  if (*pim & m2) {DIS; *pim &= ~m2;
193                                        ->; STR(pim,2);}
194           pim += 1+width; if (*pim & m2) {DIS; *pim &= ~m2;
195                                        ->; STR(pim,14);}
196           pim -= (width<<1); if (*pim & m2) {DIS; *pim &= ~m2;
197                                        ->; STR(pim,6);}
198       }
199       else if (m1 > d4) while (go) {
200           RCL(pim,dirc);
201           pim += neig4[dirc];
202           if (*pim & m2) {
203                                    ->;}
204               DIS;
205               *pim &= ~m2;
206               if (!(dirc & 1)) {STR(pim,dirc)
207                                    /* straight on, Sam */
208               else if (dirc & 2) {STR(pim,dir
209                       ->c-1);}       /* turn left */
210               else {STR(pim,dirc+1);} /* turn right */
211           ->
212       }
213
214       startread(m1-d8);
215       if (m1 == d8) while (go) {
216           RCLP(pim);
217           pim += 1-width; if (*pim & m2) {DIS; *pim &= ~m2; STR
218                                        ->(pim,8);}
219           pim -= 2;       if (*pim & m2) {DIS; *pim &= ~m2; STR
220                                        ->(pim,4);}
221           pim += width<<1; if (*pim & m2) {DIS; *pim &= ~m2; STR
222                                        ->(pim,0);}
223           pim += 2;       if (*pim & m2) {DIS; *pim &= ~m2; STR
224                                        ->(pim,12);}
225       }
226       else if (m1 > d8) while (go) {
227           RCL(pim,dirc);
228           pim += neig8[dirc];
229           if (*pim & m2) {
230               DIS;
231               *pim &= ~m2;
232               if (!(dirc & 1)) {STR(pim,dirc)
233                                    ->;}
234               else if (dirc & 2) {bug dirc
235                                    ->+1)&15, STR(pim,bug);}
236               else {STR(pim,dirc-1);}
237               /* & 15 for change of 15 to 0 */
238               /* bug- error message in cc: ST
239                                    ->R actuals too long */
240       }
241
242       startread(m1-dk);
243       if (m1 == dk) while (go) {
244           RCL(pim,dirc);
245           pim -= 1+(width<<1);
246           if (dirc != NORTH && *pim & m2) {DIS; *pim &= ~m2; STR
247                                    ->(pim,5);}
248           pim += 2;
249           if (dirc != EAST  && *pim & m2) {DIS; *pim &= ~m2; STR
250                                    ->(pim,9);}
251           pim += 1+width;
252           if (dirc != EAST  && *pim & m2) {DIS; *pim &= ~m2; STR
253                                    ->(pim,3);}
254           pim -= 4;
255           if (dirc != WEST  && *pim & m2) {DIS; *pim &= ~m2; STR
256                                    ->(pim,1);}
257           pim += width<<1;
258           if (dirc != WEST  && *pim & m2) {DIS; *pim &= ~m2; STR
259                                    ->(pim,11);}
260           pim += width-1;
261           if (dirc != SOUTH && *pim & m2) {DIS; *pim &= ~m2; STR
262                                    ->(pim,13);}
```

```
euskproc.c                                                     Page:4

244         pim -= 2;
245         if (dirc != SOUTH && *pim & m2) (DIS; *pim &= ~m2; STR
                                                    ->(pim,15);}

246     else if (m1 > dk) while (go) {
247         RCL(pim,dirc);
248         if (neigk[dirc]) {
249             pim += neigk[dirc];
250             if (*pim & m2) (DIS; *pim &= ~m2; STR(pim,dirc);}
251         }
252
253     }
254     /* all pixels with distance 'dist' are now found */
255     closewrite(pnw);
256     buckfree(b,m1-dk);
257
258     /* reshuffle register use */
259     m1 = m1|mo;
260     m2 = mo;
261
262     /* topology testing: table lookup contains Hilditch condi
                                                    ->tions */
263     startread(dist);
264     while (go)
265     {
266         RCL(pim,dirc);
267
268         /* backtracking, see figure 6, paper */
269         if ( (dirc&3) == 2 && (*(pim + neigb[dirc]) & m2)) co
                                                    ->ntinue;
270
271         /* test neighbourhood in old image, use dirc to store
                                                    ->table entry */
272         dirc = 0;
273         pim++;       if (*pim & m2) dirc |= 1;
274         pim -= 2;    if (*pim & m2) dirc |= 16;
275         pim -= width; if (*pim & m2) dirc |= 8;
276         pim++;       if (*pim & m2) dirc |= 4;
277         pim++;       if (*pim & m2) dirc |= 2;
278         pim += width<<1; if (*pim & m2) dirc |= 128;
279         pim--;       if (*pim & m2) dirc |= 64;
280         pim--;       if (*pim & m2) dirc |= 32;
281         if (luthile[dirc]) continue;
282
283         /* totally recursive neighbourhood will be build in re
                                                    ->gister byte */
284         byte = dirc;
285
286         /* test partially recursive neighbourhoods: changed pi
                                                    ->xels
287            are distinguised by mo == 1 and mi == 0, a situatio
                                                    ->n
288            which does not occur normally */
289         pim++;
290         if ((*pim&m1)==m2) {if (luthiln[dirc&~64]) continue
                                                    ->; byte &= ~64;}
291         pim -= width-1;
292         if ((*pim&m1)==m2) {if (luthiln[dirc&~1]) continue
                                                    ->; byte &= ~1;}
293
294         pim -= 2;
295         if ((*pim&m1)==m2) {if (luthiln[dirc&~16]) continue
                                                    ->; byte &= ~16;}
296         pim -= width-1;
297         if ((*pim&m1)==m2) {if (luthiln[dirc&~4]) continue
                                                    ->; byte &= ~4;}
298
299         /* test totally recursive neighbourhood */
300         pim++;     if ((*pim & m1) == m2) byte &= ~2;
301         pim -= 2;  if ((*pim & m1) == m2) byte &= ~8;
302         pim += width<<1; if ((*pim & m1) == m2) byte &= ~32;
303         pim += 2;  if ((*pim & m1) == m2) byte &= ~128;
304         if (luthiln[byte]) continue;
305
306         /* change pixel, by temporarily removing input mask */
307         *(pim-width-1) &= mi;
308     }
309     /* register shuffle */
310     m1 = mi;
311     m2 = mo;
312
313     /* update image, if pixel may be removed: remove mo, rest
                                                    ->ore m1 */
314     startread(dist);
315     while (go) {
316         RCLP(pim);
317         if (!(*pim & m1)) {
318             *pim |= m1;
319             *pim &= ~m2;
320         }
321     }
322 } /* end of dist++ loop */
323
324     /* free allocated memory for buckets */
325     buckdelete(b);
326
327     /* if applicable endpixel condition, remove branches */
328     if (end == 0)
329         if (euskrmep(pimbl,mo,mp,sizex,sizey,width,
330                     (unsigned char *)luthiln,queuesize)
331             == -1)
332             return(-1);
333
334     /* remove inner edge, preserve connectivity between outer ed
                                                    ->ge and image */
335     euskinne(pimbl,mo,sizex,sizey,width);
336
337     return(0);
338 }
339
``` bubble.c                                                                Page:1

```
 1  /* copyright
 2
 3  #include "defines.h"
 4
 5  static inline int max(int a,int b){return a > b ? a : b;}
 6  static inline int abs(int a) {return a > 0 ? a : -a; }
 7  static inline int square(int a) {return a*a;}
 8
 9  bubble::~bubble() { // recursive!
10      delete son;
11      delete dau;
12  }
13
14  bubble::bubble(pixel** pdata,int size,image* im,int level,int m
                                              ->axl,int minr) {
15      if (size == 0) {
16          bubble::pdata = NULL;
17          bubble::size = 0;
18          center = 0;
19          radius = 0;
20          x = 0;
21          y = 0;
22          bubble::level = level;
23          son = (bubble*)NULL;
24          dau = (bubble*)NULL;
25      }
26      else {
27          register pixel **p1 = pdata, **p2 = pdata+size-
                                                  ->1, **pn;
28          register int r1 = **p1, r2 = **p2;
29          pn = p2-1; // next pointer to
                                                  ->medial axis
30          while (p1 < p2) {
31              if (r1 > r2) { // until they meet
32                  r2 += ((im->x(*p2) == im->x(*pn) ?
                       im->y(*p2) == im->y(*pn)) ?
                                DIST4 : DIST8) ;//- ab
                                                  ->s(**p2 - **pn);
33              } else {
34                  pn = p1+1;
35                  r1 += (((im->x(*p1) == im->x(*pn) ?
                       im->y(*p1) == im->y(*pn)) ?
                                DIST4 : DIST8) ;//- ab
                                                  ->s(**p1 - **pn);
36                  p1++;
37              }
38          }
39          bubble::pdata = pdata;
40          bubble::size = size;
41          if (p1 == pdata && size > 1) bubble::center = 1
                                                  ->;
42          else bubble::center = p1-pdata;
43          bubble::radius = max(r1,r2);
44          bubble::x = im->x(*(pdata+center));
45          bubble::y = im->y(*(pdata+center));
46
47
48
49          bubble::level = level;
50          if (level < maxl && radius >= minr) {
51              son = new bubble(pdata+center,size-cent
                                ->er,im,level+1,maxl,minr);
52              dau = new bubble(pdata,center, im, leve
                                ->l+1, maxl,minr);
53          }
54          else son = dau = (bubble*)NULL;
55      }
56  }
57
58  void bubble::Draw() {
59      void DrawCircle(int,int,int); // see canvas.c
60      DrawCircle(x,y,radius);
61  }
62
63  void bubble::Erase() {
64      void EraseCircle(int,int,int); // see canvas.c
65      EraseCircle(x,y,radius);
66  }
67
68  int bubble::Check(int xobs, int yobs, int robs) {
69      extern bubble* first;
70      /*
71      printf("%3d %3d %3d: %3d     %3d + %3d = %3d\n",
72      xobs,yobs,x,y, DIST4*(square(x-xobs) + square(y-yobs)),
73      robs,radius, square(robs+radius));
74      */
75      if (square((radius+robs)/DIST4) > (square(x-xobs) + squ
                                                  ->are(y-yobs))) {
76          if (son == NULL || dau == NULL) return TOOBAD_I
                                                  ->NTERSECTION;
77          this->Erase();
78          son->Draw();
79          dau->Draw();
80          if (prev) prev->next = son;
81          else first = son;
82          son->next = dau;
83          dau->next = next;
84          if (next) next->prev = dau;
85          dau->prev = son;
86          son->prev = prev;
87          if (son->Check(xobs,yobs,robs) == TOOBAD_INTERS
                                                  ->ECTION)
88              return "KXHAD_INTERSECTION;
89          if (dau->Check(xobs,yobs,robs) == TOOBAD_INTERS
                                                  ->ECTION)
90              return TOOBAD_INTERSECTION;
91      }
92      return OK_NO_INTERSECTION;
93  }
``` blower.c                Page:1

```c
1   /* Comments */
2   
3   #include <stdio.h>
4   #include "bubble.h"
5   
6   #define MAXNEIG 100
7   #define MAXCHILD 26
8   #define EPSILON_MIN_RAD 0.1
9   
10  // return top of linked list until 1 left
11  blower* blower::Merge(int *go) {
12      double sqrt(double);
13      register blower *neig;
14      register blower *neigOfNeig;           // neighbour
                                               // neighbour of neigh
                                               //         ->our
15      blower* smallestNeig[MAXNEIG];         // neighbours I'm goin
                                               //   ->g to merge with
16      register int nrOfSmallestNeig=0;       // number of valid poi
                                               //  ->nters in smallestNeig
17      blower* largerNeig[MAXNEIG];           // neighbours of new b
                                               //            ->lower
18      register int nrOfLargerNeig=0;         // number of valid poi
                                               //    ->nters in largerNeig
19      bubble* largerChild[MAXCHILD];         // children of larger
                                               //               ->bubble
20      int nrOfLargerChild=0;                 // number of valid poi
                                               //  ->nters in largerChild
21      float d,dx,dy,dz;                      // some distances betw
                                               //  ->een centers of bubbles
22      float oldr = r;                        // radius of smallest
                                               //               ->bubble
23      register int i,j,k;
24      
25      // first remove doublures in array of neighbours
26      do {
27          k = 0;
28          for (i=1; i<nrOfNeig; i++) {
29              for (j=0; neighbour[i] != neighbour[j];
30                                              -> j++);
31              if (j != i) {
32                  for (j=i+1; j<nrOfNeig; j++) ne
                                               ->ighbour[j-1] = neighbour[j];
33                  k = 1;
34                  nrOfNeig--;
35              }
36          }
37      } while (k);
38      
39      // neighbour(s) to merge with is (are) neighbour(s) wit
                                               //  ->h minimum radius
40      float minrad = neighbour[0]->r;
41      for (i=1; i<nrOfNeig; i++)
42          if (neighbour[i]->r < minrad)
43              minrad = neighbour[i]->r;
44      
45      for (i=0; i<nrOfNeig; i++)
46          if (neighbour[i]->r < minrad*(1+EPSILON_MIN_RAD
                                               ->)) {
47                                             // table of neighbours which will merge
                                               //         -> with me
48              smallestNeig[nrOfSmallestNeig++] = neig
                                               ->hbour[i];
49          }
50          else {                             // table of neighbours which will not m
                                               //  ->erge, they stay neighbour
52              largerNeig[nrOfLargerNeig++] = neighbou
                                               ->r[i];
53          }
54      
55      for (i=0; i<nrOfSmallestNeig; i++)
56      {
57          neig = smallestNeig[i];
58          
59          // calculate new radius and center of larger bu
                                               //                          ->bble
60          
61          dx = x-neig->x;
62          dy = y-neig->y;
63          dz = z-neig->z;
64          d = sqrt(dx*dx+dy*dy+dz*dz);
65          if (r > d+neig->r)
66          {
67                                             // neighbor fits in the current bubble
68                                             // do nothing.
69          }
70          else if (neig->r > r + d)
71          {
72                                             // the current bubble fits in the neigh
                                               //                                 ->bor
73                                             // (should occur rarely, if ever)
74              
75              r = neig->r;
76              x = neig->x;
77              y = neig->y;
78              z = neig->z;
79          }
80          else                               // all other cases
81          {
82                                             // calculate new r, x, y and z
83              
84              r = (r + d + neig->r)/2;
85              x = (x + neig->x + (r - neig->r)*dx/d)/
                                               ->2.0;
86              y = (y + neig->y + (r - neig->r)*dy/d)/
                                               ->2.0;
87              z = (z + neig->z + (r - neig->r)*dz/d)/
                                               ->2.0;
88          }
89          
90                                             // my neighbour's bubble becomes a child of the
```

```
blower.c                                                                                        Page:2

91              largerChild[nrOfLargerChild++] = neigh->myBubble           -> larger bubble
                                                                  ->;
 92              if (nrOfLargerChild == MAXCHILD) {
 93                 printf("Maximum number of children is %
                                                                  ->d.\n",MAXCHILD);
 94              }
 95          }
 96          // my neighbour's neighbours become the neighbo
                                                                  ->urs of the larger bubble
 97          for (j=0; j<neig->nrOfNeig; j++) {
 98              neigOfNeig = neig->neighbour[j];
 99              if (neigOfNeig == this) continue;        // ex
                                                                  ->cept for me of course
100              for (k=0; k<nrOfSmallestNeig && neigOfN
                                                                  ->eig != smallestNeig[k]; k++);
101              if (k != nrOfSmallestNeig) continue;
                                                                  ->/ except for other mergers
102              for (k=0; k<nrOfLargerNeig && neigOfNei
                                                                  ->g != largerNeig[k]; k++);
103              if (k == nrOfLargerNeig)            // I don'
                                                                  ->t have you in my list yet
104                  largerNeig[nrOfLargerNeig++] =
                                                                  ->neigOfNeig;
105              if (nrOfLargerNeig == MAXNEIG)
                                                                  ->{
106                  printf("Maximum number
                                                                  ->of neighbours is %d.\n",MAXNEIG);
107              }                                        // Reset reference to me
108              for (k=0; k<neigOfNeig->nrOfNeig; k++)
109                  if (neigOfNeig->neighbour[k] ==
                                                                  -> neig) {
110                      neigOfNeig->neighbour[k
                                                                  ->] = this;
111                      // this statement can r
                                                                  ->esult in doublures!!! (see above)
112                  }
113          }
114      }
115      // My bubble is the last child
116      largerChild[nrOfLargerChild++] = myBubble;
117      if (nrOfLargerChild == MAXCHILD) {
118          printf("Maximum number of children is %d.\n",MA
                                                                  ->XCHILD);
119      }
120  }

121  // Create array of children
122  bubble** child = new bubble* [nrOfLargerChild];
123  for (k=0; k< nrOfLargerChild; k++)
124      child[k] = largerChild[k];
125
126  // Create the new bubble
127  bubble* largerBubble = new bubble(
128
129
130                                  (int)(x+0.5), (int)(y+0.5), (int)(z+0.5), (int)
                                                                  ->(r+0.5),
131                                  nrOfLargerChild,child);
132
133  // Some output
134  // printf("%10x merged %2d, %4.1f to %4.1f ",this,nrOf
                                                                  ->SmallestNeig,oldr,r);
135
136  // This blower will now take care of the larger bubble
137  myBubble = largerBubble;
138
139  // delete neighbours which were merged with me
140  for (i=0; i<nrOfSmallestNeig; i++) {
141      neig = smallestNeig[i];
142      if (neig->next) neig->next->prev = neig->prev;
143      if (neig->prev) neig->prev->next = neig->next;
144      delete neig;
145  }
146
147  // make a new list of neighbours
148  delete neighbour;
149  nrOfNeig = nrOfLargerNeig;
150  neighbour = new blower* [nrOfLargerNeig];
151  for (k=0; k< nrOfLargerNeig; k++) neighbour[k] = larger
                                                                  ->Neig[k];
152
153  if (next == 0) (*go = 0; return this; }  // largest: REA
                                                                  ->DY!!!!!!!!
154  if (next->r >= r) return this;            // I'm still th
                                                                  ->e smallest!

155  // next element will be returned
156  blower *smallest = next;
157  smallest->prev = 0;
158
159  // put me in right place in double linked list
160  blower *n = next;
161  while (n->next && n->next->r < r) n = n->next;
162  prev = n;
163  next = n->next;
164  n->next = this;
165  if (next) next->prev = this;
166
167  return smallest;
168 }

169
170
171 void RelAdd(register int* t, register int sizex, int register s
                                                                  ->izey) {
172      *t++ = 1+sizex+sizex*sizey;
173      *t++ = 1+sizex*sizey;
174      *t++ = 1-sizex+sizex*sizey;
175      *t++ = 1+sizex;
176      *t++ = 1;
177      *t++ = 1-sizex;
178      *t++ = 1+sizex-sizex*sizey;
179      *t++ = 1-sizex*sizey;
``` blower.c   Page:3

```
180        *t+- = 1-sizex-sizex*sizey;
181        *t++ = -sizex*sizey;
182        *t++ = sizex*sizey;
183        *t++ = -sizex*sizey;
184        *t++ = sizex;
185        *t++ = -sizex;
186        *t++ = sizex-sizex*sizey;
187        *t++ = -sizex*sizey;
188        *t++ = -sizex-sizex*sizey;
189        *t++ = -1-sizex*sizey;
190        *t++ = 1-sizex*sizey;
191        *t++ = -1-sizex*sizey;
192        *t++ = -1-sizex;
193        *t++ = -1;
194        *t++ = -1-sizex;
195        *t++ = -1-sizex-sizex*sizey;
196        *t++ = -1-sizex*sizey;
197        *t++ = -1-sizex*sizey;
198        *t++ = -1-sizex-sizex*sizey;
199   }
200   int comp(blower **b1, blower **b2) {
201        if ((*b1)->r == (*b2)->r)
202             return ((*b2)->r);
203        else
204             return (int) ((*b1)->r-(*b2)->r);
205   }
206
207   int Count(register pixel *dist, int sizex, int sizey, int sizez
                                                             ->) {
208        register int leng = sizex*sizey*sizez;
209        register int count=0;
210        while (--leng >= 0)
211             if(*dist++)
212                  count++;
213
214        return count;
215   }
216
217
218   void Label(pixel *labData, register blower*** can, register int
                                                             ->nrInCan,
219             register int sizex, int sizey, int sizez) {
220        register pixel *lab = labData;
221        register int leng = sizex*sizey*sizez;
222        while (--leng >= 0) *lab++ = 0;
223
224        register int facz = sizex*sizey;
225        lab = labData;
226        can++;
227        for (register int i=1; i<=nrInCan; i++, can++)
228             *(lab+(int)((*can)->x)+(int)((*can)->y)*sizex+
229                       ->(int)((*can)->z)*facz)= i;
230   }
231
232   // Put medial axis pixels in can;
233   void PutInCan(register pixel *dist, register int sizex, registe
                                                             ->r int sizey,
                                                             int sizez, blower **can) {
234
235        int reladd[26];
236        void RelAdd(int*,int,int);
237        RelAdd(reladd,sizex,sizey);
238
239        register int n, nrOfNeig;
240        can++;
241        for (int k=0; k<sizez; k++) {
242             for (register int j=0; j<sizey; j++) {
243                  for (register int i=0; i<sizex; i++, dist++
                                                             ->) {
244
245                       if(*dist) {
246                            for (n=0, nrOfNeig=0; n
                                                             -><(26; n++)
                                                             if (*(dist+rela
                                                             ->dd[n]))
                                                             nrOfNei
                                                             ->g++;
247                            *can++ = new blower(i,j
                                                             ->,k,*dist/DIST1,nrOfNeig);
248                       }
249                  }
250             }
251        }
252   }
253
254
255
256   void Network(register pixel *lab, register int sizex, int sizey,
                                                             ->, int sizez,
257                  register blower**can) {
258
259        int reladd[26];
260        void RelAdd(int*,int,int);
261        RelAdd(reladd,sizex,sizey);
262
263        register blower** neighbour;
264        register int n;
265        register int nrOfNeig;
266        register pixel myLabel, neigLabel;
267        pixel labels[26];
268
269        for (int k=0; k<sizez; k++) {
270             for (int j=0; j<sizey; j++) {
271                  for (register int i=0; i<sizex; i++, la
                                                             ->b++) {
272                       if (*lab) {
273                            myLabel = *lab;
274                            nrOfNeig = 0;
275                            for (n=0; n<26; n++) {
276                                 neigLabel = *(l
                                                             ->ab+reladd[n]);
277                                 if (neigLabel)
278                                      labels
                                                             -> ->nrOfNeig++] = neigLabel;
``` blower.c                                  Page:4

```
279              } // all neighbouring l
                 ->labels have been found
280              neighbour = new blower*
                                ->(nrOfNeig];
281              for (n=0; n<nrOfNeig; n
                                     ->++)
282                  neighbour[n] =
                         ->can[labels[n]];
283              can[myLabel]->neighbour
                         -> = neighbour
284                      // can[myLabel]->nrOfNe
                 ->ig = nrOfNeig; done in PutInCan
285          }
286      }
287  }
288
289
290
291  // Double link list;
292  void Convert(register blower** can, register int nrInCan) {
293      can++; // first member useless
294      nrInCan -= 2; // first and last get special treatment
295      (*can)->prev = 0;
296      (*can)->next = *(can+1);
297      can++;
298      while (--nrInCan>=0) {
299          (*can)->prev = *(can-1);
300          (*can)->next = *(can+1);
301          can++;
302      }
303      (*can)->prev = *(can-1);
304      (*can)->next = 0;
305  }
306
307  bubble*
308  MakeHierarchy(pixel* distData, int sizex, int sizey, int sizez,
                                      -> {
309      int qsort(char*,int,unsigned int, int(*)(blower**,blowe
                                      ->r**));

310      // Count medial axis pixels in input image
311      int nrInCan=Count(distData,sizex,sizey,sizez);
312
313      // Put medial axis pixels in can;
314      blower** can = new blower* [nrInCan+1];
315      // labels start at 1, 0th member skipped
316      PutInCan(distData,sizex,sizey,sizez,can);
317
318      // sort can on size
319      qsort((char*)(can+1), nrInCan, sizeof(blower*), comp);
320
321      // Label bottom of the hierarchy
322      pixel *labData = new pixel[sizex*sizey*sizez];
323      Label(labData,can,nrInCan,sizex,sizey,sizez);
324
325      // create network of neighbours
326
327      Network(labData,sizex,sizey,sizez,can);
328
329      // Double link list
330      Convert(can,nrInCan);
331
332      blower* smallest = *(can+1); // not zero because label
                                      ->0 does not exist
333      delete can;
334      int go=1;
335      while(go) {
336          smallest = smallest->Merge(&go);
337          //smallest->CountBlowers();
338      }
339
340      bubble* top = smallest->myBubble;
341      delete smallest;
342
343      return top;
344  }
345
346  void blower::CountBlowers() {
347      blower* b = this;
348      for (int count = 0; b; b = b->next) count++;
349      if (count > 1) printf("%d blowers left.\n",count);
350      else printf("READY\n");
351  }
```

What is claimed is:

1. A machine having a memory which contains a data structure which represents the shape of a physical object in a position and/or motion control machine as a hierarchy of bubbles generated by a method comprising the steps of:

first locating the medial axis of the object and then creating a hierarchy of bubbles on the medial axis.

2. The machine of claim 1 wherein the step of creating the hierarchy comprises a top-down procedure of:

first placing a root bubble which is centered at the center of gravity of the object and has a radius equal to the maximum distance from the center of gravity to the contour of the object;

next, if the medial axis has a plurality of branch lines, placing a plurality of first successive bubbles each of which encompasses a distinct part of the object which is described by one of said branch lines; and then successively dividing each line of the medial axis into two new line parts and placing a pair of next successive bubbles each of which encompasses a distinct part of the object which is described by one said new line parts.

3. The machine of claim 1 wherein the step of creating the hierarchy comprises a bottom-up procedure of:

first representing the medial axis as large plurality of discrete points;

next placing the centers of a plurality of lowest level bubbles at said discrete points, where the radius of each bubble is equal to the minimum distance from the corresponding center point to the contour of the object; and then successively creating new bubbles by merging the smallest bubble remaining with its smallest neighbor(s) to create a new bubble and repeating this step until only one root bubble remains.

4. The machine of claim 1 wherein two old bubbles are merged to yield a new bubble in accordance with the formulas:

$$r' = (r1 + j + r2)/2$$

$$x' = 1/2\left(x1 + x2 + \frac{r1 - r2}{j}(x1 - x2)\right)$$

$$y' = 1/2\left(y1 + y2 + \frac{r1 - r2}{j}(y1 - y2)\right)$$

$$z' = 1/2\left(z1 + z2 + \frac{r1 - r2}{j}(z1 - z2)\right);$$

wherein $r1$ and $r2$ are the radii of the old bubbles, $j$ is the distance between the centers of the old bubbles, $(x1, y1, z1)$ and $(x2, y2, z2)$ are the coordinates of the center of the old bubbles, $r'$ is the radius of the new bubble, and $(x', y', z')$ are the coordinates of the center of the new bubble.

5. A robotic controller comprising:

means for controlling the motion of one or more objects, said means for controlling responsive to a means for generating a data structure;

said means for generating a data structure representative of the shape of one or more of said objects which includes:

a) means for calculating the position of the medial axis of said object and b) means for creating the hierarchy of bubbles all of which have centers which are disposed on the medial axis.

* * * * *